March 8, 1927.
H. A. THRUSH
1,620,582
WATER RELIEF VALVE
Filed April 9, 1925
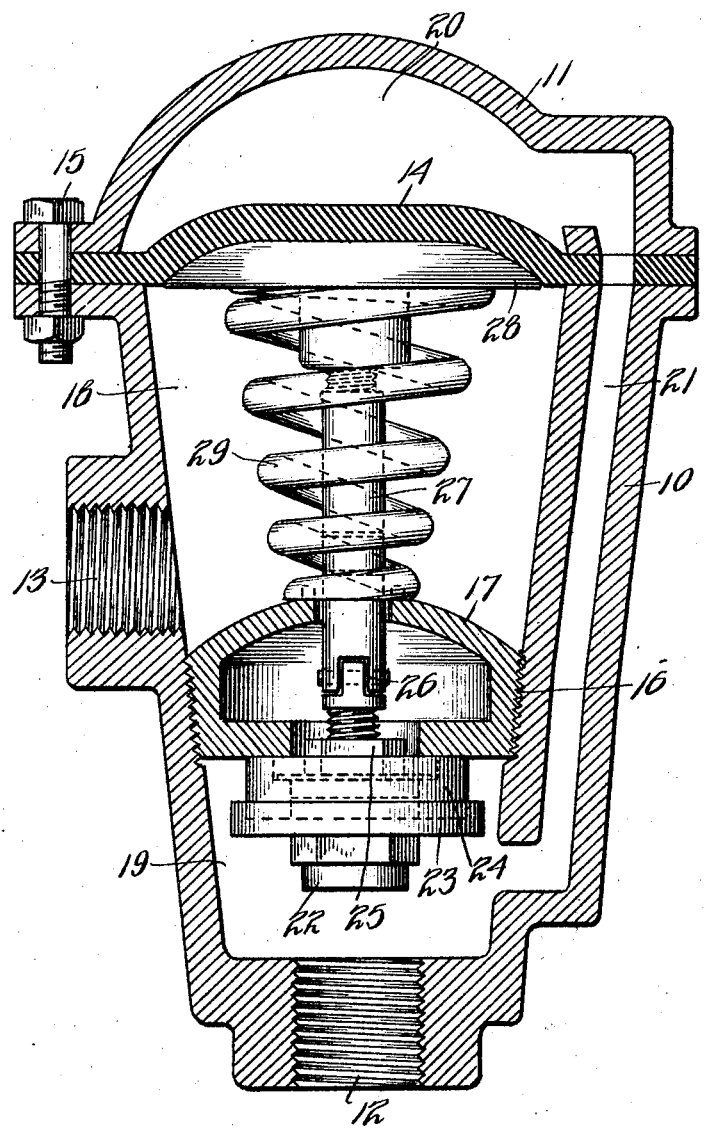
Inventor
Homer A. Thrush
By [signature]
Attorney Patented Mar. 8, 1927.

1,620,582

UNITED STATES PATENT OFFICE.

HOMER A. THRUSH, OF PERU, INDIANA.

WATER RELIEF VALVE.

Application filed April 9, 1925. Serial No. 21,916.

My said invention relates to water relief valves and it is an object of the invention to simplify the construction of such a valve without interfering with the satisfactory operation thereof, the valve being of a type particularly useful in connection with hot and cold water supplying devices or hot water heating systems though not limited thereto.

Referring to the accompanying drawing which is made a part hereof and on which similar reference characters indicate similar parts, The figure shows a central vertical section of the device.

In the drawing reference character 10 indicates the integral body of the valve which is open at one end (preferably the upper end), the opening being closed by a cap 11. An inlet 12 serves to connect the valve to a source of pressure and an outlet at 13 leads to the outer air or to a chamber such as a water waste line. A diaphragm 14 is held between coacting flanges on the body and the cap through which bolts 15 pass by means of which the cap and the body are fastened together.

The body is hollow with a downwardly tapering interior face which is threaded at 16 to hold in place a screw plug 17 separating the upper chamber 18 from the lower chamber 19. The lower chamber is in communication with a source of pressure through the inlet 12 and is also in communication with a chamber 20 between the cap and the diaphragm by way of a passage 21 here shown as leading from chamber 19 to chamber 20 through the wall of the casing and the cap but which may in some instances be outside the valve.

A valve 22 in the lower chamber 19 comprises a metal washer 23, a rubber washer 24, and a nut 25 on the threaded stem of the valve for holding the washers in place. The upper part of the stem is connected flexibly to the main stem 27 by a universal joint at 26. The main stem has at its upper end a foot 28 threaded on the stem 27 to permit adjustment of the length of the valve stem. The foot 28 rests against the diaphragm 14.

The screw plug 17 is hollow and has a passage in its lower wall normally closed by the valve 22. The stem 27 extends through a passage in the upper wall and is surrounded by a spring 29 bearing at one end against the head 28 and at the other against the top wall of screw plug 17 to hold the valve 22 in the position shown in the drawing. The screw plug may be solid if desired. The screw plug is provided on its upper face with projections or recesses for engagement by a spanner or the like, and obviously might have straight sides to engage a valve body of uniform diameter or having a threaded part of uniform diameter.

In the normal operation of the device the parts are situated as illustrated and continue in that position until the pressure in the system rises to such a height as to force the diaphragm 14 downward against the pressure of the spring whereupon the valve 22 is lowered and permits the water to pass out through the openings in the upper and lower walls of plug 17. When sufficient of the hot water has escaped through the passages indicated and through the outlet 13 to reduce the pressure so that the diaphragm can again be forced upward to its normal position by the spring 29 the passage through the walls of the plug 17 will again be closed. Obviously such a valve may be useful in other relations and with liquids other than water or with gas under pressure and therefore I do not limit myself to the use above described. Neither do I limit myself to the specific structure shown in the drawings and described in the specification, except as indicated in the appended claims, since many changes will be obvious to those skilled in the art.

Having thus fully described my said invention, what I claim as new and desire to secure by Letters Patent is:

1. A valve comprising a tapered body casting having openings in its small end and tapered side forming respectively inlet and outlet passages, a hollow cap casting for closing the large end of the body casting, a hollow plug removably secured between said inlet and outlet passages and having upper and lower alined openings therethrough, a valve for normally closing the lower opening, a flexible stem attached to said valve, a diaphragm between the body and cap for directing pressure against the upper end of the valve stem for unseating said valve when pressure is directed against the diaphragm, a by-pass formed in said body casting and providing communication between the smaller end of the valve and the remote side of the diaphragm, substantially as set forth.

2. A valve comprising a tapered body casting having openings in its small end and tapered side forming respectively inlet and outlet passages, a hollow cap casting for closing the large end of the body casting, a hollow plug removably secured between said inlet and outlet passages and having upper and lower alined openings therethrough, a valve for normally closing the lower opening, a flexible stem attached to said valve, a diaphragm between the body and cap for directing pressure against the upper end of the valve stem for unseating said valve when pressure is directed against the diaphragm, a by-pass formed in said body casting and providing communication between the smaller end of the valve and the remote side of the diaphragm, and a spring disposed between the diaphragm and the hollow plug for normally holding the valve against its seat whereby the hollow plug will be kept filled with fluid with the valve submerged when in closed position, substantially as set forth.

In witness whereof, I have hereunto set my hand at Peru, Indiana this 6th day of April, A. D. nineteen hundred and twenty-five.

HOMER A. THRUSH.